(12) United States Patent
Juestel et al.

(10) Patent No.: US 7,855,497 B2
(45) Date of Patent: Dec. 21, 2010

(54) DIELECTRIC BARRIER DISCHARGE LAMP COMPRISING AN UV-B PHOSPHOR

(75) Inventors: Thomas Juestel, Witten (DE); Petra Huppertz, Roetgen (DE); Detlef Uwe Wiechert, Alsdorf (DE); Walter Mayr, Alsdorf (DE); Heinrich Von Busch, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1095 days.

(21) Appl. No.: 11/568,039

(22) PCT Filed: Apr. 19, 2005

(86) PCT No.: PCT/IB2005/051267
§ 371 (c)(1),
(2), (4) Date: Oct. 18, 2006

(87) PCT Pub. No.: WO2005/104162
PCT Pub. Date: Mar. 11, 2005

(65) Prior Publication Data
US 2009/0223901 A1    Sep. 10, 2009

(30) Foreign Application Priority Data
Apr. 22, 2004    (EP)    ................... 04101680

(51) Int. Cl.
*H01J 1/70*    (2006.01)

(52) U.S. Cl. ........................... 313/486; 445/23

(58) Field of Classification Search ......... 313/484–493; 445/23
See application file for complete search history.

(56) References Cited

U.S. PATENT DOCUMENTS
2002/0041145 A1    4/2002    Yokosawa et al.
2002/0050780 A1    5/2002    Justel et al.
2003/0116723 A1*   6/2003    Yoshida .............. 250/504 R FOREIGN PATENT DOCUMENTS
DE    2730063 A1 *  7/1976
EP    1111025 A2    6/2001
EP    1154461 A1    11/2001
EP    1154461 B1    11/2001

OTHER PUBLICATIONS
Heinrich Von Busch et al., A Short History (1999-2202) of the Project "Dielectric Barrier Discharges" from General Lighting to Water Treatment. Download from the Philips Repweb.

* cited by examiner

*Primary Examiner*—Nimeshkumar D Patel
*Assistant Examiner*—Christopher M Raabe

(57) ABSTRACT

A dielectric barrier Xe discharge lamp include discharge vessel with a gas filling containing Xe or a Xe/Ne mixture and a luminescent layer of a UV-B phosphor emitting in the UV-B range 280 to 320 nm. The luminescent layer includes a $Gd^{3+}$ activated phosphor according to at least one the formulas of $(Y_{1-x-y}Gd_xS_y)Al_3(BO_3)_4$, $(La_{1-x-y}Gd_xS_y)Al_3(BO_3)_4$, $(La_{1-x-y}Gd_xS_y)B_3O_6$, $(Y_{1-x-y-z}Gd_xS_yLu_z)PO_4$, $(Y_{1-x-y-z}Gd_xS_yLu_z)BO_3$, $(Y_{1-x-y-z}Gd_xS_yLu_z)_3Al_5O_{12}$, $Me(Y_{1-x-y}Gd_xS_y)F_4$ (Me=Li, Na, K; S=Bi, Nd, Pr; $0.0<x,z\leq1.0$; $0.0<y\leq0.1$) or a mixture thereof. The luminescent layer may be sensitized by $Bi^{3+}$, $Pr^{3+}$ or $Nd^{3+}$.

2 Claims, 4 Drawing Sheets

DIELECTRIC BARRIER DISCHARGE LAMP COMPRISING AN UV-B PHOSPHOR

The invention concerns a discharge lamp for generating ultraviolet light comprising a gastight vessel filled with a Xe or a Xe/Ne mixture as well as a method for manufacturing such a lamp.

Light sources for general lighting purposes rely either on black body radiation emitted by solids at high temperature as incandescent and halogen lamps or on various types of light emitting gas discharges, e.g. low- or high-pressure mercury lamps.

Among the types based on light emitting gas discharges, dielectric barrier discharge (DBD) lamps are characterized by the fact that at least one of the electrodes does not have direct contact with the discharge gas, but is separated from it by an electrically insulating layer. When a high voltage is applied, the strong electric field between the electrodes will lead to a breakdown and to the flow of an electric current in the gas. This current will stop itself by building up an internal field, due to the separation of carriers of opposite charges that is involved, which internal field finally cancels the external field. By reversing the external voltage, a new discharge pulse can be ignited. DBD lamps are thus operated on AC voltages, with typical peak-to-peak amplitudes of 1.5-6 kV and frequencies of 1-200 kHz.

Due to their pulsed nature, barrier discharges are particularly suited for the efficient operation with gas fillings that are capable of producing excimers (excited diners). Among these fillings, xenon is the most efficient one. Although barrier discharges have been known for one and a half century, only ten years ago it was discovered that by driving the lamp by voltage pulses or block waves instead of sinusoidal waveforms, the $Xe_2$*UV emission at 172 nm can be generated with discharge efficiencies of up to 65%.

DBD lamps are presently used in photochemistry and, with fluorescent layers, in high-end copiers and back-lighting. Another application is plasma display panels, which basically represent arrays of miniaturized DBD lamps. US 2002/0050780 A1 discloses a rare gas low-pressure discharge lamp for generating ultraviolet light with a discharge vessel, which is filled with rare gas and is at least partly coated with a phosphor, which radiates UV-A light upon excitation by an excitation radiation produced in the discharge vessel.

On the other hand, UV-B emitting fluorescent lamps are applied for phototherapy and to a lesser extent for photochemistry purposes. Mainly $Gd^+$ activated phosphors have found application in UV-B lamps, since $Gd^{3+}$ shows efficient line emission, located at 310-312 nm, due to transition within the $4f^7$ configuration ($^6P_{7/2}$-$^8S_{7/2}$). Since this emission line(s) is(are) in a wavelength range where the therapeutic effect for the treatment of psoriasis peaks (295-313 nm) takes place, those phosphors have found application in medical skin treatment lamps, based on the Hg low-pressure discharge. A widely applied phosphor is $LaB_3O_6$:Bi,Gd, in which $Bi^{3+}$ is used as a sensitizer for the absorption of the most intense atomic Hg line at 254 nm. Although the energy transfer from $Bi^{3+}$ to $Gd^{3+}$ is fairly efficient, the phosphor shows still a broad emission band due to a 5p-5s transition related to $Bi^{3+}$. Alternatively, some manufacturers apply a broad band emitting phosphor peaking a 295 nm, e.g. $SrAl_{12}O_{19}$:Ce. A considerable drawback of this phosphor is that a very open and thus expensive lamp glass has to be used to avoid too much absorption of the phosphor emission by the lamp glass.

The main drawback of the presently applied low-pressure discharge lamps equipped with those $Gd^{3+}$ activated UV-B phosphors is their short-term degradation. This is caused by the interaction between the luminescent material and Hg from the plasma. The result from this chemical interaction is the formation of a blackening layer on top of the phosphor layer. This absorptive layer is especially formed, if phosphors are applied which contain $Bi^{3+}$ or $Pb^{2+}$, i.e. $s^2$-ions, as an activator or sensitizer. For instance, UV-B lamps for psoriasis treatment purposes employing $LaB_3O_6$:Bi,Gd show more than 30% light reduction within the first few operation hours. As a consequence, lamp burn-in is required to obtain stable light output to fulfil the specifications over the specified system lifetime.

Unfortunately, this problem has not been solved so far, since the required $Gd^{3+}$ emission at 311 nm is most efficiently sensitised by $Bi^{3+}$ for 254 nm excitation.

This invention relates to UV-B emitting phosphor and their application in dielectric barrier discharge (DBD) lamps. The DBD lamps consist of a gas-tight discharge vessel with a gas filling containing Xe or a Xe/Ne mixture, whereby between 0 to 90 vol-% Ne is added. The discharge vessel is equipped with electrodes and is provided with a luminescent layer, which comprises at least one luminescent material emitting in the UV-B range (280 to 320 nm).

The emission of the $Xe_2$*excimer discharge peaks at about 172 nm, whereby a second broad band at 150 nm is present, see FIG. 5. Conversion of the Xe excimer spectrum into UV-B light can be achieved by so-called VUV phosphors.

The invention is characterized by the application of $Gd^{3+}$ activated phosphors in DBD lamps, whereby those host lattices with a band gap around 150 to 180 nm are preferably applied to obtain a high efficiency under the excitation scheme in the claimed DBD lamps. A nice example for a $Gd^{3+}$ activated phosphor which efficiency peaks at 171 nm is $YAl_3(BO_3)_4$:Gd, see example b).

In another embodiment co-activated $Gd^{3+}$ phosphor is applied, i.e. materials sensitised by an ion having an electronic level energetically lying between 6.5 and 8.0 eV above the ground state level. This is the case for $Bi^{3+}$, $Pr^{3+}$ and $Nd^{3+}$. The sensitisation scheme can be described as follows:

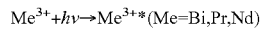

$Me^{3+}+h\nu \rightarrow Me^{3+}$*(Me=Bi,Pr,Nd)

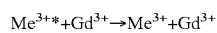

$Me^{3+}$*+$Gd^{3+} \rightarrow Me^{3+}+Gd^{3+}$

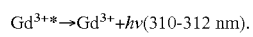

$Gd^{3+}$*$\rightarrow Gd^{3+}+h\nu$(310-312 nm).

The advantages of the claimed DBD lamps over UV-B emitting low-pressure Hg lamps are a free design of the lamp geometry, e.g. bent, flat, tubular, etc., a long lamp lifetime (more than 20,000 h), no plasma lines in the range 200 to 800 nm. Therefore, it is possible to manufacture phototherapy equipment comprising flat DBD lamps as light tiles instead of tubular fluorescent lamps. This will result in a much more homogeneous light distribution. Furthermore the spectral power distribution is only dependent on the phosphor blend, efficiency is high and the lamp is Hg free (environmentally friendly product).

These lamps are advantageously applied for medical and photochemistry purposes. In particular, it is preferable to use these lamps for medical skin treatment purposes. Since $Cl_2$ strongly absorbs in the range 300-320 nm, see FIG. 6, these lamps are also useful for the photochemical reduction of $Cl_2$ to chloride in water.

The invention is illustrated by the following embodiments of methods of preparing a luminescent layer:

a) Synthesis of $GdPO_4$:Nd

The starting materials 25.00 g (28.97 mmol) $Gd_2O_3$ and 0.234 g (0.70 mmol) $Nd_2O_3$ are suspended in ethanol. Under intensive stirring 16.877 g (146.29 mmol) 85 vol-% $H_3PO_4$ is added. After 24 h stirring at room temperature, the solvent is removed by evaporation. The obtained powder is dried at 100° C. and 0.40 g LiF is added as a flux.

The dried powder is annealed for 2 h at 800° C. in air. Afterwards, it is annealed for 2 h at 1000° C. in air. The resulting powder is washed with 150 ml HNO$_3$ (65 vol-%) and then with 600 ml demineralised water. Finally, the dried powder is milled on a roller bench for several hours. The gained powder has an average particle size of 3-4 µm.

b) Synthesis of YAl$_3$(BO$_3$)$_4$:Gd

The starting materials 3.00 g (13.29 mmol) Y$_2$O$_3$, 0.098 g (0.271 mmol) Gd$_2$O$_3$, 4.411 g (40.67 mmol) Al$_2$O$_3$ (alon-c) and 6.873 g (111.16 mmol) H$_3$BO$_3$ are suspended in demineralised water. The suspension is treated by ultrasound for 10 minutes. Afterwards the water is removed by distillation. The remaining powder is dried at 100° C. and subsequently annealed at 900° C. for 1 h in air. After a thorough grinding step the powder is annealed at 1200° C. for 2 h in air. Finally, the powder is milled again, washed in 200 ml water, and dried at 100° C. The obtained powder has an average particle size of about 5 µm.

c) Single-Component DBD Lamp with LaB$_3$O$_6$:Gd,Bi in Quartz Glass

A suspension of nanoparticle SiO$_2$ is made on a butylacetate basis with nitrocellulose as binder. The suspension is applied to the inner wall of a quartz tube by using a flow coat related procedure. Then a suspension of LaB$_3$O$_6$:Gd,Bi is prepared on a butylacetate basis with nitrocellulose as binder. Using a similar flow coat related procedure, the suspension is applied to the inner wall of the precoated lamp tube with a typical phosphor layer weight in the range of 1-10 mg/cm$^2$. The binder is burned in a standard heating cycle with peak temperatures between 500 and 600° C. The glass tube is sealed and filled with Xe using a thorough pumping cycle. Oxygen impurities have to be strictly excluded. Typical gas pressures are 200-300 mbar pure Xe. Al-electrodes are attached to the outer side of the tube by means of adhesion or painting. The lamps are typically operated at 5 kV and 25 kHz using a pulse driving scheme. The emission spectrum is determined using an optical spectrum multianalyser.

d) Single-Component DBD Lamp Comprising YAl$_3$(BO$_3$)$_4$:Gd in Quartz Glass

A suspension of nanoparticle SiO$_2$ is made on a butylacetate basis with nitrocellulose as binder. The suspension is applied to the inner wall of a quartz tube by using a flow coat related procedure. Then a suspension of YAl$_3$(BO$_3$)$_4$:Gd is prepared on a butylacetate basis with nitrocellulose as binder. Using a similar flow coat related procedure the suspension is applied to the inner wall of the precoated lamp tube with a typical phosphor layer weight in the range 2-6 mg/cm$^2$. The binder is burned in a standard heating cycle with peak temperatures between 500 and 600° C. The glass tube is sealed and filled with Xe using a thorough pumping cycle. Oxygen impurities have to be strictly excluded. Typical gas pressures are 200-300 mbar pure Xe. Al-electrodes are attached to the outer side of the tube by means of adhesion or painting. The lamps are typically operated at 5 kV and 25 kHz using a pulse driving scheme. The emission spectrum is determined using an optical spectrum multianalyser.

Further objects of the invention will become apparent from the subsequent drawings.

Figure 1:
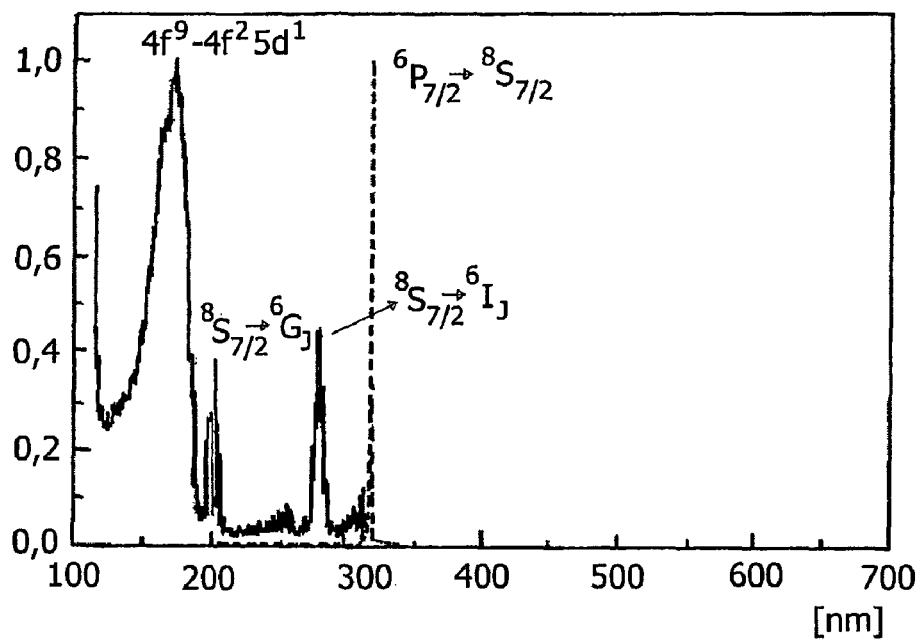
FIG. 1 is an excitation and emission spectrum of GdPO$_4$: 1% Nd according to embodiment a) showing the excitation (solid line) and emission (dotted line) intensity [a.u.] for each wavelength [nm]
Figure 2:
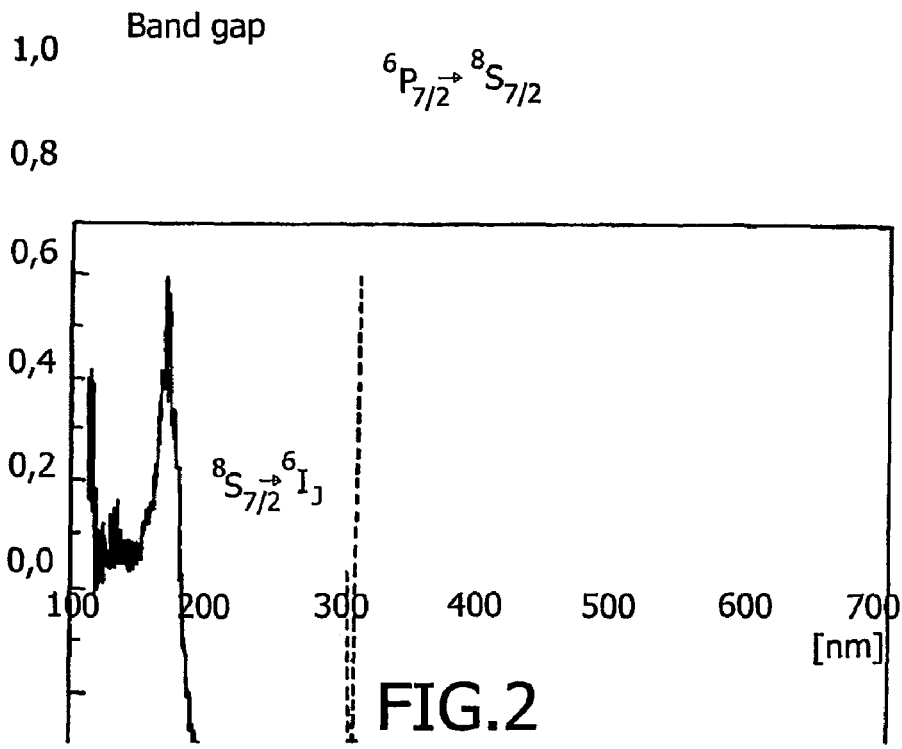
FIG. 2 is an excitation and emission spectrum of YAl$_3$(BO$_3$)$_4$:Gd according to embodiment b) showing the excitation (solid line) and emission (dotted line) intensity [a.u.] for each wavelength [nm]
Figure 3:
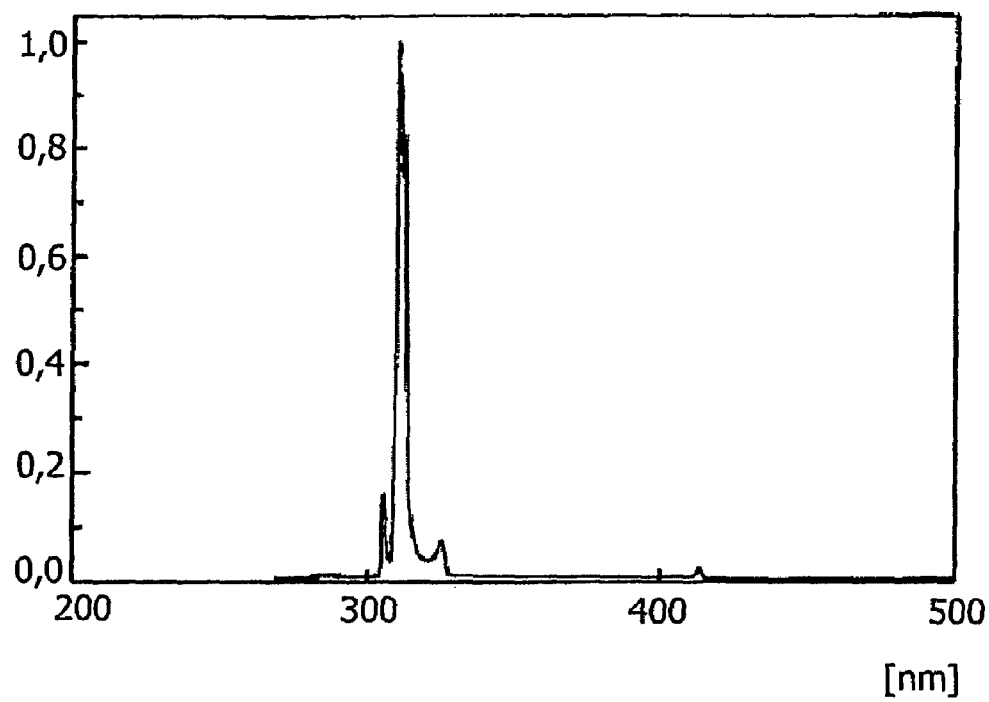
FIG. 3 is an emission spectrum of a Xe discharge lamp comprising LaB$_3$O$_6$:Gd,Bi according to embodiment c) showing the emission intensity [a.u.] for each wavelength [nm]
Figure 4:
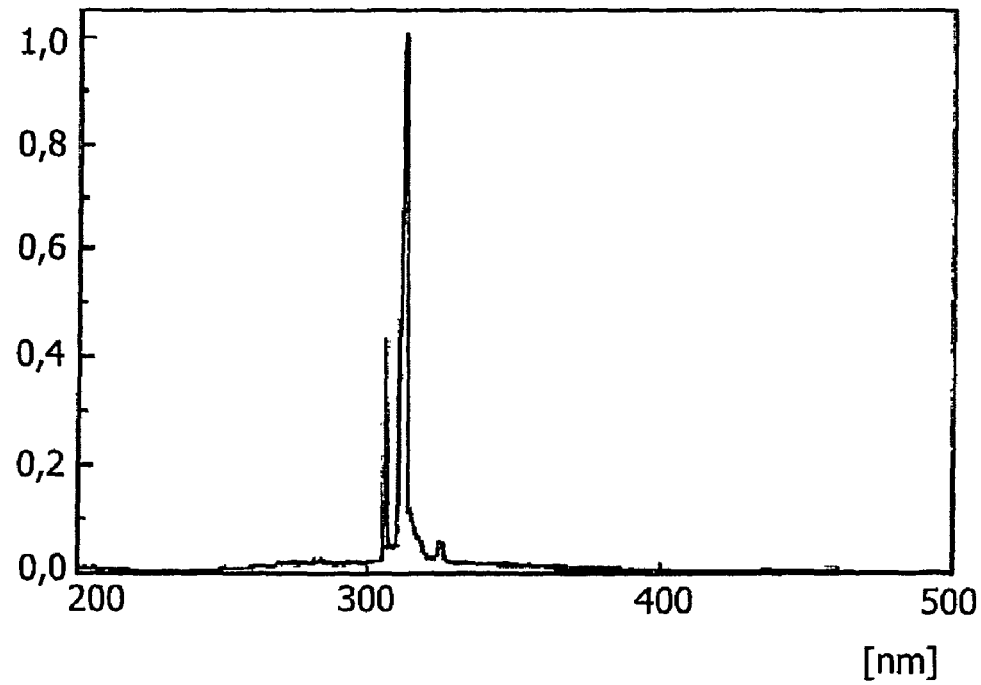
FIG. 4 is an emission spectrum of a Xe discharge lamp comprising YAl$_3$(BO$_3$)$_4$:Gd according to embodiment d) showing the emission intensity [a.u.] for each wavelength [nm]
Figure 5:
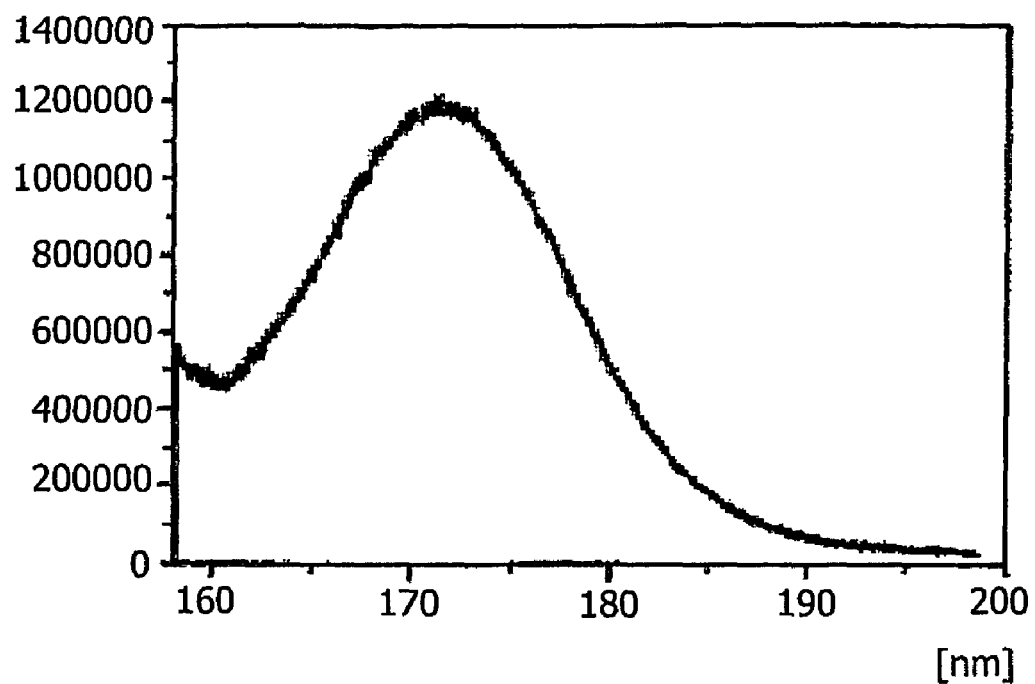
FIG. 5 is the emission spectrum of an excimer discharge showing the intensity of each wavelength [nm]
Figure 6:
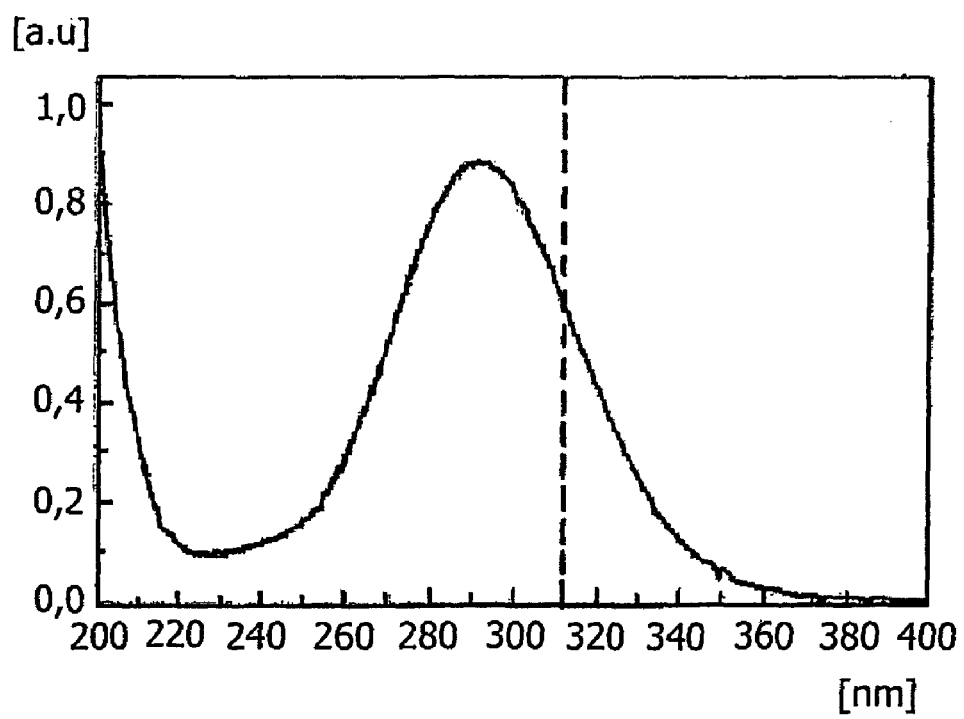
FIG. 6 is the absorption spectrum of Cl$_2$ in water at pH 7.7 showing the relative absorption for each wavelength.
Figure 7:
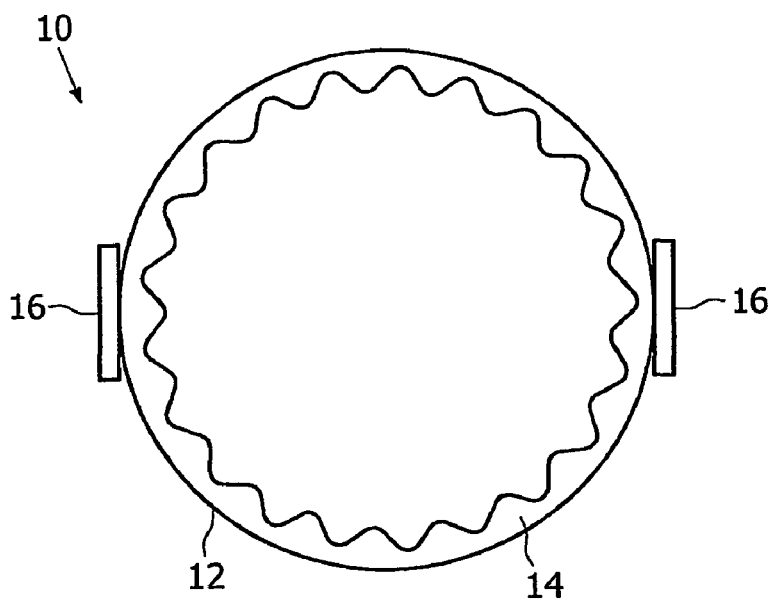
Figure 8:
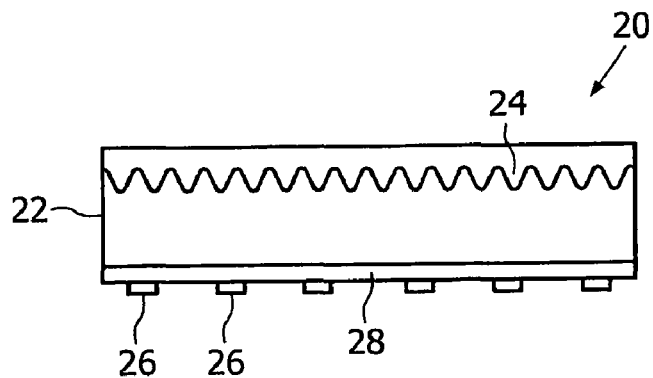
Figure 9:
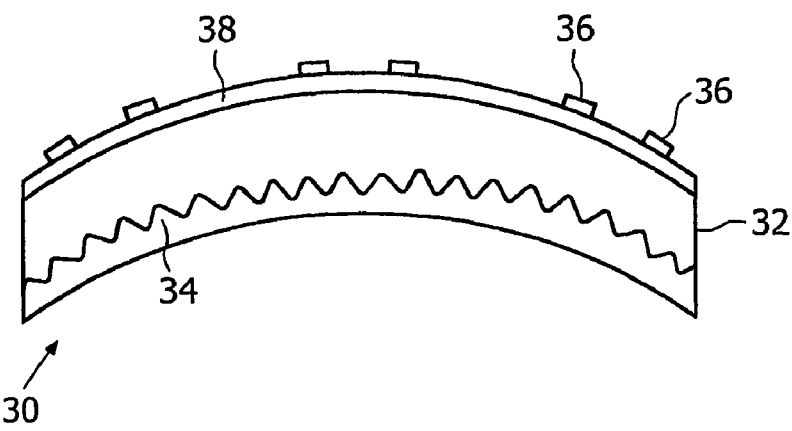

FIG. 7 is a cross-section of a typical embodiment of a tubular DBD lamp 10 for tanning purposes with outer stripe electrodes 16 attached to the discharge vessel 12 containing the Xe gas filling and the phosphor 14;

FIG. 8 is a cross-section of a typical embodiment of a flat DBD lamp 20 for tanning purposes with outer stripe electrodes 26 attached to the discharge vessel 22 and a phosphor or phosphor combination 24 containing in addition an UV reflecting layer 28;

FIG. 9 is a cross-section of a typical embodiment of a bent DBD lamp 30 for tanning purposes with outer stripe electrodes 36 attached to the discharge vessel 32 and a phosphor or phosphor combination 34 containing in addition an UV reflecting layer 38.

The invention claimed is:

1. A discharge lamp for generating ultraviolet (UV) light comprising:
   a gastight vessel having in inner surface and filled with Xe or a Xe/Ne mixture bounded by the inner surface;
   an electrode attached to an outer surface of the gastight vessel; and
   a UV reflecting layer between the electrode and the gastight vessel, wherein the gastight vessel includes a luminescent layer comprising at least one luminescent material emitting UV-B radiation in a range of 280-320 nm, and wherein the luminescent material comprises at least one of $(Y_{1-x-y}Gd_xS_y)Al_3(BO_3)_4$, $(La_{1-x-y}Gd_xS_y)Al_3(BO_3)_4$, $(La_{1-x-y}Gd_xS_y)B_3O_6$, $(Y_{1-x-y-z}Gd_xS_yLu_z)PO_4$, $(Y_{1-x-y-z}Gd_xS_yLu_z)BO_3$, $(Y_{1-x-y-z}Gd_xS_yLu_z)_3Al_5O_{12}$, $Me(Y_{1-x-y}Gd_xS_y)F_4$(Me=Li, Na, K; S=Bi, Nd, Pr; $0.0<x,z\leq1.0$; $0.0<y\leq0.1$) or a mixture thereof.

2. A method of manufacturing a discharge lamp for generating ultraviolet (UV) light comprising the acts of:
   forming a gastight vessel;
   filling the gastight vessel with Xe or a Xe/Ne mixture;
   coating the gastight vessel with a luminescent layer emitting UV-B radiation in a range of 280-320 nm;
   forming an electrode on an outer surface of the gastight vessel; and
   forming a UV reflecting layer between the electrode and the gastight vessel,
   wherein the luminescent layer comprises at least one luminescent material emitting UV-B radiation in a range of 280-320 nm, and wherein the luminescent material comprises at least one of $Y_{1-x-y}Gd_xS_y)Al_3(BO_3)_4$,$(La_{1-x-y}Gd_xS_y)Al_3(BO_3)_4$,$La_{1-x-y}Gd_xS_yB_3O_6$, $(Y_{1-x-y-z}Gd_xS_yLu_z)PO_4$,$(Y_{1-x-y-z}Gd_xS_yLu_z)BO_3$, $(Y_{1-x-y-z}Gd_xS_yLu_z)_3Al_5O_{12}$ $Me(Y_{1-x-y}Gd_xS_y)F_4$(Me=Li, Na, K; S=Bi, Nd, Pr; $0.0<x,z\leq1.0$; $0.0<y\leq0.1$) or a mixture thereof.

* * * * *